United States Patent
Belov et al.

(10) Patent No.: US 12,031,068 B2
(45) Date of Patent: Jul. 9, 2024

(54) ADHESIVE TAPE WITH A POORLY FLOWABLE PRESSURE-SENSITIVE ADHESIVE AND RELEASE LINER BASED ON A PRESSURE-SENSITIVE SILICONE COATING

(71) Applicant: tesa SE, Norderstedt (DE)

(72) Inventors: Nikolay Belov, Hamburg (DE); Tobias Winkler, Hamburg (DE); Birgit Sommer, Norderstedt (DE)

(73) Assignee: tesa SE, Norderstedt (DE)

( * ) Notice: Subject to any disclaimer, the term of this patent is extended or adjusted under 35 U.S.C. 154(b) by 787 days.

(21) Appl. No.: 16/965,412

(22) PCT Filed: Jan. 15, 2019

(86) PCT No.: PCT/EP2019/050982
§ 371 (c)(1),
(2) Date: Jul. 28, 2020

(87) PCT Pub. No.: WO2019/145194
PCT Pub. Date: Aug. 1, 2019

(65) Prior Publication Data
US 2021/0032508 A1   Feb. 4, 2021

(30) Foreign Application Priority Data
Jan. 29, 2018   (DE) .................... 10 2018 201 328.4

(51) Int. Cl.
*C09J 7/00* (2018.01)
*C09J 7/38* (2018.01)
*C09J 7/40* (2018.01)

(52) U.S. Cl.
CPC .............. *C09J 7/401* (2018.01); *C09J 7/385* (2018.01); *C09J 2301/304* (2020.08); *C09J 2483/005* (2013.01); *Y10T 428/1457* (2015.01); *Y10T 428/1476* (2015.01); *Y10T 428/2839* (2015.01)

(58) Field of Classification Search
None
See application file for complete search history.

(56) References Cited

U.S. PATENT DOCUMENTS

| | | | |
|---|---|---|---|
| 4,576,999 A | 3/1986 | Eckberg | |
| 4,678,846 A | 7/1987 | Weitemeyer | |
| 4,725,630 A | 2/1988 | Magee | |
| 4,978,726 A | 12/1990 | Dohler | |
| 6,057,041 A * | 5/2000 | Sumi ..................... | B32B 27/283 428/40.1 |
| 6,274,213 B1 | 8/2001 | Kawashima | |
| 6,387,487 B1 * | 5/2002 | Greenberg ............. | C09J 183/04 428/355 R |
| 8,709,596 B2 | 4/2014 | Jauer | |
| 2009/0047459 A1 | 2/2009 | Behrens | |
| 2009/0117310 A1 * | 5/2009 | Ellringmann ............ | C09J 7/381 427/551 |
| 2013/0316076 A1 | 11/2013 | Sherman | |
| 2015/0284590 A1 * | 10/2015 | Endo ....................... | C08L 83/04 524/588 |
| 2016/0208142 A1 * | 7/2016 | Furuta ........................ | C09J 7/10 |

FOREIGN PATENT DOCUMENTS

| | | |
|---|---|---|
| CA | 2971652 A1 | 1/2018 |
| DE | 3316166 A1 | 11/1983 |
| DE | 3820294 C1 | 10/1989 |
| DE | 60001779 T2 | 2/2004 |
| DE | 102008027501 A1 | 12/2009 |
| EP | 0168713 B1 | 1/1986 |
| EP | 1070734 B1 | 3/2003 |
| EP | 1652899 A1 | 5/2006 |
| EP | 2062952 A1 | 5/2009 |
| EP | 2025507 B1 | 12/2010 |
| EP | 2524954 A1 | 11/2012 |
| WO | 20100022154 A2 | 2/2010 |
| WO | 2013181133 A1 | 12/2013 |

OTHER PUBLICATIONS

China National Intellectual Property Administration, First Office Action for China Patent Application No. 201980009545 X dated Sep. 1, 2021, 3 pages.
China National Intellectual Property Administration, Second Office Action for China Patent Application No. 201980009545, dated Mar. 17, 2022, 17 pages.
China National Intellectual Property Administration, Notification to Grant Patent Right for Invention for China Patent Application No. 201980009545, dated Oct. 21, 2022, 3 pages.
International Search Report for International Application No. PCT/EP2019/050982, dated Jul. 10, 2019.
Donatas Satas, Handbook of Pressure Sensitive Adhesive Technology, 1999, pp. 1-5, 632-683, 3rd. Ed., Satas & Associates, Warwick, Rhode Island, U.S.A.
European Patent Office, Office Action for European Patent Application No. 19700803.0, dated Jan. 24, 2024, 11 pages.

* cited by examiner

Primary Examiner — Anish P Desai
(74) Attorney, Agent, or Firm — Price Heneveld LLP

(57) ABSTRACT

A laminate is provided, more particularly an adhesive tape, comprising a) a release liner having at least one carrier layer (CL) and also, applied to this carrier layer (CL), at least one silicone coating (SC) of specific addition-crosslinked or radically crosslinked pressure-sensitive silicone adhesives, and b) at least one further layer (L1), comprising polyacrylate-based adhesives with low tack at room temperature or heat-activable bondable adhesives which have little or no pressure-sensitive adhesion at room temperature. The use of an arrangement as a release liner is also provided, where the arrangement comprises a carrier layer (CL) and also, applied to this carrier layer (CL), a silicone coating (SC) of specific addition-crosslinked or radically crosslinked pressure-sensitive silicone adhesives.

13 Claims, No Drawings

ADHESIVE TAPE WITH A POORLY FLOWABLE PRESSURE-SENSITIVE ADHESIVE AND RELEASE LINER BASED ON A PRESSURE-SENSITIVE SILICONE COATING

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/EP2019/050982, filed on Jan. 15, 2019, designating the United States of America, which in turn claims the benefit of priority under 35 U.S.C. §§ 119, 365 of German Patent Application No. 10 2018 201 328.4, filed Jan. 29, 2018, the contents of which are relied upon and incorporated herein by reference in their entirety.

FIELD OF THE DISCLOSURE

The object and field of the disclosure is a laminate, more particularly an adhesive tape, which comprises polyacrylate-based adhesives with low tack at room temperature or heat-activable, bondable adhesives which have little or no pressure-sensitive adhesion at room temperature and which also comprises a release liner, with the release liner having a sufficient release force of at least 3 cN/cm. This prevents accidental detachment of the liner during the production or storage process and also during the use of the adhesive tape provided with the liner.

BACKGROUND

Adhesive tapes coated on one or both sides with adhesives are usually wound up at the end of the production process to form a roll in the form of an Archimedean spiral. To prevent the adhesives making contact with one another or sticking to the carrier, a variety of procedures are known in the prior art. On the one hand it is possible to use adhesives which exhibit adhesions of differing extent and which therefore can be detached from one another again even after direct contact (see U.S. Pat. No. 6,274,213 B1). On the other hand, the adhesive tapes may be applied, before winding, to a liner material (also called release material), which is wound up together with the adhesive tape. Such liner materials are also known to the skilled person as release liners or liners. In addition to the lining of single-sided or double-sided adhesive tapes, liners are also used for enclosing labels. There are also adhesive tapes possible which operate not with two liners but instead with a single liner equipped with double-sided release. In that case the web of adhesive tape is lined on its top side with one side of a double-sidedly releasing liner, and on its bottom side with the reverse side of the double-sidedly releasing liner. This is the case in particular for an adjacent turn on a bale or a roll.

The functions of the liner (release paper, release film) therefore include the function of an aid to the storage of the adhesive tape or for its further processing by die-cutting. When a double-sided adhesive tape furnished with a liner is unrolled, it is normally adhered to a substrate by the open—that is, liner-free—side of the pressure-sensitive adhesive. The other side of the pressure-sensitive adhesive, meanwhile, still adheres on the coated surface of the liner to a sufficient extent to allow the handling of the adhesive tape. The liner, though, must be removable from the adhesive tape, in order to allow bonding on the second side of the double-sided adhesive tape. In contrast to an adhesive tape carrier, therefore, the liner cannot be firmly joined to the layer of adhesive on the adhesive tape or label. Moreover, the liner itself or its removal must not significantly detract from the peel adhesion force of the pressure-sensitive adhesive for its subsequent use. At the same time, the stability of the release coating on the liner, in other words the adhesiveness, over long periods is important, in order to ensure the function of this coating and also the properties of the pressure-sensitive adhesive enclosed by the liner.

A liner according to the prior art consists of at least one adhesive layer, also referred to as a "release layer", in order to reduce the tendency of adhering products to adhere to these surfaces (active release function). This layer may be applied on a carrier material. As liner carrier material it is possible in particular to use papers or films. Films used are preferably those of biaxially oriented polyethylene terephthalate, polybutene, polypropylene, polyethylene, monoaxially oriented polypropylene, biaxially oriented polypropylene or polyethylene, with particular preference given to polyolefin films (polypropylene and polyethylene films) or polyester films. Polymer-coated papers or nonwovens are also encountered.

As a release layer it is possible to use all of the systems known to the skilled person, especially those as identified in the "Handbook of Pressure Sensitive Adhesive Technology" by Donatas Satas (Satas & Associates, Warwick 1999). The material of the adhesive release layer according to the prior art is preferably selected from the group encompassing silicones, fluorinated silicones, silicone copolymers, waxes, carbamates, fluoropolymers and polyolefins, and also mixtures of two or more of the substances stated.

Crosslinkable silicone systems are frequently employed as a release layer. They include mixtures of crosslinking catalysts and what are called thermally curable polysiloxanes which crosslink by condensation, by addition or radically. For condensation-crosslinking silicone systems, crosslinking catalysts present in the composition are frequently tin compounds, such as dibutyl tin diacetate. Silicone-based release coatings on an addition-crosslinking basis can be cured by hydrosilylation. These release systems typically comprise the following constituents: an alkenylated polydiorganosiloxane (especially linear polymers having terminal alkenyl groups and/or terminal and internal vinyl groups, and also branched silicones having terminal vinyl groups), a polyorganohydrogensiloxane crosslinking agent and a hydrosilylation catalyst. Established catalysts for addition-crosslinking silicone systems include platinum or compounds of platinum, such as the Karstedt catalyst [a Pt(0) complex compound], for example, and also rhodium catalysts.

Additionally it is also possible to use photoactive catalysts, known as photoinitiators, in combination with UV-curable, cationically crosslinking siloxanes on an epoxide and/or vinyl ether basis, and/or UV-curable, radically crosslinking siloxanes such as acrylate-modified siloxanes, for instance. Likewise possible is the use of silicone acrylates curable by electron beams. Such systems, depending on their intended use, may also include further adjuvants such as stabilizers, pigments, antistatic additives or flow control assistants. Also employed are additives which improve the anchorage of silicone layer on the carrier material.

Additionally known are various kinds of organopolysiloxane compositions which crosslink through heating or irradiation. They include compositions of the kind described for example in DE 600 01 779 T2, which crosslink by addition reaction, namely by temperature treatment of a mixture of an organopolysiloxane having hydrogen atoms bonded directly to the silicon atoms and of an organopolysiloxane having vinyl groups bonded directly to the silicon atoms, in the presence of a hydrosilylation catalyst.

Photopolymerizable organopolysiloxane compositions can be used as well. Examples include compositions which are crosslinked by the reaction between organopolysiloxanes which have hydrocarbon radicals substituted by (meth)acrylate groups and bonded directly to the silicon atoms, and in the presence of a photosensitizer (see EP 0 168 713 B1 or DE 38 20 294 C1). Likewise possible for use are compositions wherein the crosslinking reaction between organopolysiloxanes which have mercapto group-substituted hydrocarbon bonded directly to the silicon atoms and organopolysiloxanes having vinyl groups bonded directly to the silicon atoms is brought about in the presence of a photosensitizer. Compositions of this kind are described for example in U.S. Pat. No. 4,725,630 A1.

Where the organopolysiloxane compositions described for example in DE 33 16 166 C1 are used that have hydrocarbon radicals substituted by epoxy groups and bonded directly to the silicon atoms, the crosslinking reaction is induced by the release of a catalytic amount of acid which is obtained by photodecomposition of added onium salt catalysts. Other organopolysiloxane compositions curable by a cationic mechanism are materials which have, for example, propenyloxysiloxane end groups.

Particular embodiments of the silicone systems are polysiloxane block copolymers, with urea blocks, for example, of the kind available from Wacker Chemie AG under the trade name Geniomer®, or release systems composed of fluorosilicones, which are used in particular with adhesive tapes comprising silicone adhesives.

Further options for use as a release layer are waxes, fluorinated or partly fluorinated polymers or polyolefins, especially polyethylene block copolymers, as described in EP 2 025 507 B1 or WO 2010/022154 A2, and also carbamates.

In order to prevent accidental detachment of the liner from the pressure-sensitive adhesive layer of the adhesive tape, release forces of at least 3 cN/cm are desirable. The release forces can be adjusted to the required values through the addition of what are called MQ resins, with the release value of the liner increasing with the proportion of the MQ resin in the silicone system. MQ resins are silicone compounds which contain structural units of the formulae $(R_3SiO_{1/2})$ (M unit) and $(SiO_{4/2})$, (Q unit). R here stands for an organic group, as for example a substituted or unsubstituted monovalent hydrocarbon group. Since the release value of the liner is dependent on the pressure-sensitive adhesive used in the adhesive tape, as well as on the silicone coating and on the proportion of MQ resin in this coating, the release forces achieved, at less than 3 cN/cm, are very weak, especially in the case of polyacrylate-based adhesives with low tack at room temperature or in the case of heat-activable, bondable adhesives which have little or no pressure-sensitive adhesion at room temperature, even when very large amounts of MQ resin are added. A possible consequence of these weak release forces is the accidental detachment of the liner as early as during production, storage or use.

SUMMARY OF THE DISCLOSURE

The object is achieved by means of a laminate, more particularly adhesive tape, comprising:

A at least one release liner, comprising at least one carrier layer (CL) and also at least one silicone coating (SC), comprising an addition-crosslinked pressure-sensitive silicone adhesive which is obtainable by reacting:
  a) at least one organopolysiloxane having a weight-average molecular weight $M_w$ of 30,000 to 2,000,000 g/mol which comprises at least one diorganosiloxane unit and at least two silicon-bonded alkenyl groups,
  b) at least one compound which is suitable for crosslinking organopolysiloxanes containing alkenyl groups and comprises at least two silicon-bonded hydrogen atoms,
  c) optionally at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group,
  where the reaction of components a), b) and optionally c) is accelerated by a catalyst, B at least one further layer (L1), comprising a polyacrylate-based adhesive having low tack at room temperature or a heat-activable, bondable adhesive which has little or no pressure-sensitive adhesion at room temperature.

Additionally the object is achieved by means of a laminate, more particularly adhesive tape, comprising:

A at least one release liner, comprising at least one carrier layer (CL) and also at least one silicone coating (SC), comprising a radically crosslinked pressure-sensitive silicone adhesive which is obtainable by reacting:
  a) at least one organopolysiloxane having a weight-average molecular weight $M_w$ of 30,000 to 2,000,000 g/mol which comprises at least one diorganosiloxane unit and optionally at least one hydroxyl group,
  b) at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group,
  where the reaction of components a) and b) is initiated by a radical initiator, B at least one further layer (L1), comprising a polyacrylate-based adhesive having low tack at room temperature or a heat-activable, bondable adhesive which has little or no pressure-sensitive adhesion at room temperature.

Lastly the object is achieved through the use as release liner of an arrangement which comprises at least one carrier layer (CL) and also at least one silicone coating (SC) of the above-described addition-crosslinked or radically crosslinked pressure-sensitive silicone adhesives.

The silicone coatings (SC) used in the release liner of the product according to the invention are already known from the prior art (see EP 2 524 954 A1, US 2013/0316076 A1, EP 1 652 899 A1). In accordance with the disclosure of these documents, however, this silicone coating, on the basis of its adhesive properties, is used not in release liners removable prior to bonding, being used instead as a pressure-sensitive adhesive for the bonding of protective films for displays, window pictures, and symbols.

Surprisingly, then, it has been found that through the use of the silicone coatings known in the prior art, sufficient release values of at least 3 cN/cm can be obtained if these silicone coatings are used in release liners for pressure-sensitive adhesives having low tack at room temperature.

Adhesives referred to as "pressure-sensitive adhesives" (PSAs) are those that permit a lasting bond to the substrate even under relatively slight applied pressure. In the context of the present invention, a PSA possesses a peel adhesion of at least 1 N/cm. This peel adhesion is determined on steel in accordance with ISO 29862:2007 (Method 3) at 23° C. and 50% relative humidity with a removal velocity of 300 mm/min and a removal angle of 180°. An etched polyethylene terephthalate (PET) film with a thickness of 36 μm is used as a reinforcing film, and such film is obtainable from Coveme S.p.A. (Italy). The bonding of a measurement strip 2 cm wide is performed here by means of a roll-on machine at 4 kg at a temperature of 23° C. The adhesive tape is removed immediately after application. The measured value (in N/cm) is obtained as the average from three individual measurements.

PSAs have permanent pressure-sensitive adhesion at room temperature, thus having a sufficiently low viscosity and a high touch-tackiness, so that they wet the surface of the respective substrate even with slight contact pressure. The bondability of the adhesives is based on their adhesive properties, and the redetachability on their cohesive properties.

DETAILED DESCRIPTION OF THE PREFERRED EMBODIMENTS

The laminate, more particularly adhesive tape, of the invention may be configured without a carrier or else with at least one carrier material. If a carrier material is present, it may have been provided on one side or preferably both sides with the PSA B (layer (L1)) or may consist of that adhesive. The carrier material encompasses all flat structures, examples being films or film sections extending in two dimensions, tapes of extended length and limited width, tape sections, die-cuts (in the form, for example, of surrounds or edgings of an (opto-) electronic arrangement), multilayer arrangements, and the like. For different applications it is possible here to combine a wide variety of different carriers such as, for example, films, wovens, nonwovens and papers, with the adhesives.

As the carrier material, it is possible to use all flat structures, examples being films or film sections extending in two dimensions, tapes of extended length and limited width, tape sections, die-cuts (in the form, for example, of surrounds or edgings of an (opto-)electronic arrangement), multilayer arrangements, and the like. For different applications it is possible here to combine a wide variety of different carriers such as, for example, films, wovens, nonwovens and papers, with various adhesives.

As the carrier material of the laminate, preference is presently given to using polymer films, film composites, or films or film composites provided with organic and/or inorganic layers. Such films/film composites may consist of any common plastics used for producing films, with examples including but not limited to the following: polyethylene, polypropylene—especially the oriented polypropylene (OPP) produced by monoaxial or biaxial stretching, cyclic olefin copolymers (COCs), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

The carrier may also be in combination with organic or inorganic coatings or layers. This may be accomplished by customary methods such as, for example, coating, printing, vapor deposition, sputtering, coextrusion or lamination. Mention may be made here illustratively, but without limitation, of oxides or nitrides of silicon and of aluminum, indium tin oxide (ITO) or sol-gel coatings.

Carrier Layer (CL) of the Release Liner A

In accordance with the invention, the release liner A comprises at least one carrier layer (CL). As the carrier layer (CL), it is possible in principle to use any carrier layer which is known to the skilled person for use in laminates, especially adhesive tapes. Employed in particular, however, as the carrier layer (CL) are papers or films. Films in this case are preferably those of polyethersulfones, polysulfones, polyolefins and polyesters, especially of biaxially oriented polyethylene terephthalate, polybutene, polypropylene, polyethylene, monoaxially oriented polypropylene and also biaxially oriented polypropylene or polyethylene. Especially preferred in accordance with the invention is the use of polyolefin films (polypropylene and polyethylene films) or polyester films as the carrier layer (CL). More particularly, the carrier layer (CL) is a multilayer film construction (film laminate), in the form, for example, A-B-A or A-B-C, where A, B and C correspond to the film materials above. Polymer-coated papers or nonwovens can also be used.

Silicone Coating (SC) of the Release Liner A

The release liner A further comprises at least one silicone coating (SC), which comprises at least one addition-crosslinked or radically crosslinked pressure-sensitive silicone adhesive (silicone PSA) composed of polyorganosiloxanes and silicone resins. It has emerged that these silicone PSAs exhibit sufficiently high adhesion to PSAs with low tack at room temperature, even where the coating thickness of the adhesive on the carrier is low, to achieve sufficient release forces of at least 3 cN/cm. The very stable Si—O—Si bonding gives these silicone PSAs a high resistance, moreover, to environmental influences, such as UV light and high temperatures, and so the laminates of the invention possess outstanding storage stability.

According to a first preferred embodiment of the present invention, the silicone coating (SC) comprises an addition-crosslinked, pressure-sensitive silicone adhesive which is obtainable by reacting:

a) at least one organopolysiloxane having a weight-average molecular weight $M_w$ of 30,000 to 2,000,000 g/mol which comprises at least one diorganosiloxane unit and at least two silicon-bonded alkenyl groups, b) at least one compound which is suitable for crosslinking organopolysiloxanes containing alkenyl groups and comprises at least two silicon-bonded hydrogen atoms, c) optionally at least one silicone resin having a weight-average molecular weight $M_w$ of 500 to 29,999 g/mol which comprises at least one structural unit $(R^1_3SiO_{1/2})$, $(R^1SiO_{3/2})$, $(R^1_2SiO_{2/2})$ or $(SiO_{4/2})$, in which $R^1$ is an organic group, more particularly a substituted or unsubstituted monovalent hydrocarbon group, where the reaction of components a), b) and optionally c) is accelerated by a catalyst.

In this context, it has proven advantageous in the invention if the addition-crosslinked silicone PSA is prepared using a defined molar ratio of the above-recited components a) and b). This allows a defined degree of crosslinking, and hence the cohesion of the silicone PSA, to be established. In particular, the use of a molar ratio of silicon-bonded hydrogen atoms in component b) to the silicon-bonded alkenyl groups in component a) of 0.5 to 7 has proven advantageous in relation to the cohesion required for the release force of at least 3 cN/cm.

To increase the release values of the silicone coating (SC) of the release liner A, it is possible when preparing the addition-crosslinked silicone PSA to add a silicone resin (component c)). These resins are polydispersed mixtures of differently substituted siloxanes having different molecular weights. The radicals on the silicon atom may be satisfied by organic groups or further siloxane compounds, to produce branched silicone resins. Depending on the functionality of the silicon group (mono-, di-, tri- or tetra-functional), the siloxane units are abbreviated using the symbols M, D, T and Q. M here stands for an $R_3SiO_{1/2}$ unit, D for an $R_2SiO_{2/2}$ unit, T for an $RSiO_{3/2}$ unit and Q for an $SiO_{4/2}$ unit. Each R independently of any other represents a substituted or unsubstituted monovalent hydrocarbon group. Employed preferably as component c) are silicone resins constructed from MQ, MTQ, TQ, MT or MDT units. Particularly preferred for use as component c) are MQ resins of the formula $(R^1{}_3SiO_{1/2})_x(SiO_{4/2})_y$, in which $R^1$ in each case is an organic group, more particularly a substituted or unsubstituted monovalent hydrocarbon group. The ratio of M units to Q units is preferably in the range from 0.5 to 1.2. By adding such silicone resins it is possible to achieve a further increase in the release value of the silicone coating (SC) of the release liner A. In this way, moreover, the release value of the release liner A can be tailored to the particular application, without having to use release coatings of different kinds for producing the release liner.

Within this embodiment it has proven preferable in the invention if components a), b) and optionally c) are used in defined total amounts. Preferably, therefore, component a) is used in a total amount of 20 to 60 parts by weight, component b) in a total amount of 3 to 10 parts by weight and component c) in a total amount of 30 to 75 parts by weight, based in each case on the sum total of components a), b) and c), of 100 parts by weight.

The crosslinking of the above-recited components a) and b) takes place by hydrosilylation reaction between the alkenyl-functionalized organopolysiloxanes and the corresponding SiH-functionalized organopolysiloxanes. This hydrosilylation reaction is accelerated in the invention through the use of catalysts. Catalysts used are, in particular, platinum catalysts or rhodium catalysts. In relation to the cohesion required for the release force of at least 3 cN/cm, it has proven advantageous if the platinum or rhodium catalyst is used preferably in a total amount of 50 to 1,000 ppm, calculated as platinum metal or rhodium metal and based on the sum total of components a), b) and c), of 100 parts by weight. The crosslinking reaction is carried out preferably at elevated temperatures of 100 to 150° C.

According to a second preferred embodiment of the present invention, the silicone coating (SC) comprises a radically crosslinked, pressure-sensitive silicone adhesive which is obtainable by reacting:
a) at least one organopolysiloxane having a weight-average molecular weight $M_w$ of 30,000 to 2,000,000 g/mol which comprises at least one diorganosiloxane unit and optionally at least one hydroxyl group,
b) at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group,
where the reaction of components a) and b) is initiated by a radical initiator.

In the context of the present invention, however, provision may also be made to use as starting compound a reaction product of the at least one organopolysiloxane a) and of the at least one silicone resin b), and then to carry out further crosslinking of this product by addition of the radical initiator.

Organopolysiloxanes a) used may be linear, cyclic or branched polydialkylsiloxanes. Particular preference is given to using, as component a), linear polydimethylsiloxanes and polydimethylsiloxanes which contain terminal hydroxyl groups. The silicone resins used as component b) correspond to the silicone resins described in connection with the first preferred embodiment. In connection with this embodiment as well it has proven advantageous, with regard to the raising of the release value, if the silicone resin used comprises the MQ silicone resins described above as being preferred.

In the context of this embodiment, it has proven preferable in the invention if components a) and b) are used in defined total amounts for preparing the silicone PSA. Preferably, therefore, component a) is used in a total amount of 25 to 55 parts by weight and component b) in a total amount of 45 to 75 parts by weight, based in each case on the sum total of components a) and b) of 100 parts by weight.

In order to achieve sufficient cohesion, components a) and b) are compounded with at least one radical initiator. Particular preference is given in this context to using peroxo initiators, especially benzoyl peroxide (BPO). To obtain the release values of at least 3 cN/cm it is preferred to use the radical initiator in a defined quantity range. It has therefore proven advantageous to use the at least one radical initiator, more particularly benzoyl peroxide, in a total amount of 5 to 15 parts by weight, based on the sum total of components a) and b), of 100 parts by weight. The above-stated total amounts of the radical initiator allow the production of silicone PSAs which have a sufficient cohesion to achieve release values of at least 3 cN/cm on PSAs with low tack at room temperature. Radical crosslinking takes place preferably at elevated temperatures, more particularly at 170 to 190° C.

According to a further preferred embodiment of the present invention, the addition-crosslinked or radically crosslinked silicone PSA is prepared using silicone resins, especially the above-recited MQ resins, which have a weight-average molecular weight $M_w$ of 1,000 to 25,000 g/mol. The average molecular weight $M_w$ data in this specification are based on determination by gel permeation chromatography. The use of silicone resins having the above-recited molecular weight permits particularly effective adaptation of the required release value, even in conjunction with PSAs having only a low tack at room temperature.

The release values of the release liner A that are achieved with the silicone coating (SC) can be adapted to particular requirements by varying the fraction of the silicone resin during the preparation of the silicone PSA. By raising the fraction of silicone resin it is likewise possible in this case to raise the release value achieved for the release liner A. In this way it is possible easily to adapt the release liner A to the release value required for the particular application. Preferably, therefore, the silicone coating (SC) has a weight ratio of the organopolysiloxane a) (component a) of the first and second embodiment) to the silicone resin (component c) of the first embodiment and component b) of the second embodiment) of 1:1 to 1:3, more particularly of 2:3 to 1:2.

Besides the resin modification, the silicone PSAs of the first and second embodiment of the present invention may also comprise further additives. These additives are selected more particularly such that the release values of the coating are not impaired. Examples of possible further additives used are as follows:

Process stabilizers, such as vinylsilanes or alkynols as inhibitors for the platinum or rhodium catalyst;

Process accelerators, such as aminoorganyls; and

Fillers, such as silicon dioxide, glass (ground or in the form of beads), aluminum oxides and zinc oxides.

The silicone coating (SC) of the release liner is applied to the release layer (CL), preferably in the form of a solution or dispersion, and the solvent is subsequently removed at elevated temperatures. This is preferably followed next by a further temperature increase, in order to achieve crosslinking of the organopolysiloxanes.

To enable the redetachability of the release liner A from the PSA (L1), the silicone coating (SC) of the release liner A must have a low surface energy. Accordingly, the release properties and/or the cohesion must be attuned to the adhesive properties of the PSA (L1). Serving as a key variable describing the detachment behavior is the release force or removal force. In order on the one hand to achieve sufficient adhesion of the release liner during the handling of the laminate, more particularly adhesive tape, release forces of at least 3 cN/cm are required. With release forces that are lower, there may be unwanted detachment of the liner during production, storage and handling. On the other hand, however, in order to ensure easy detachment of the release liner from the PSA, the release force must also, though, not be too high. According to one preferred embodiment of the present invention, therefore, the silicone coating (SC) has a removal force of 3.0 to 200 cN/cm, preferably of 4.0 to 190 cN/cm, more particularly of 5.0 to 180 cN/cm, the removal force being determined in accordance with the measurement method defined herein. The above-recited removal or release forces on the one hand permit sufficient adhesion of the release liner A on the PSA (L1) during production, handling and storage of the laminate of the invention, while on the other hand also permitting simple removal of the liner after application of the PSA (L1) to the desired substrate.

Surprisingly it has emerged that sufficient release forces with PSAs which have only a low tack at room temperature are obtained even when the silicone coating (SC) itself is not tacky. It is true that the silicone coating (SC) comprises a silicone PSA. However, as a result of the thin application of this silicone PSA, the silicone coating (SC) of the release liner A is not tacky. According to one particularly preferred embodiment of the present invention, therefore, the silicone coating (SC) has a thickness of 0.5 to 200 µm, more particularly of 1.0 to 100 µm.

Pressure-Sensitive Adhesive B (Layer L1)

As layer (L1), the laminate of the invention comprises at least one polyacrylate-based adhesive with low tack at room temperature or a heat-activable, bondable adhesive which has little or no pressure-sensitive adhesion at room temperature.

As the polyacrylate-based PSA with low tack at room temperature it is possible to use random copolymers originating from unfunctionalized α,β-unsaturated acrylic acid or acrylates. Preference is given to using α,β-unsaturated carboxylic acids and their derivatives of the general structure (I) as follows:

$$CH_2=C(R^3)(COOR^4) \quad (I)$$

where $R^3$ is H or $CH_3$ and $R^4$ is H or linear, branched or cyclic, saturated or unsaturated alkyl radicals having 1 to 30, especially having 4 to 18, carbon atoms.

Monomers used very preferably in the sense of the general structure (I) encompass acrylic and methacrylic esters with alkyl groups consisting of 4 to 18 C atoms. Specific examples of such compounds, without wishing to be limited by this recitation, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, branched isomers thereof, such as 2-ethylhexyl acrylate and isooctyl acrylate, for example, and also cyclic monomers such as, for example, cyclohexyl or norbornyl acrylate and isobornyl acrylate.

It is additionally possible optionally to use vinyl monomers from the following groups: vinyl esters, vinyl ethers, vinyl halides, vinylidene halides, and vinyl compounds containing aromatic rings or heterocycles in α position. For the optionally employable vinyl monomers, examples may be given of selected monomers useful in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene and a-methylstyrene. Further monomers useful in accordance with the invention are glycidyl methacrylate, glycidyl acrylate, allyl glycidyl ether, 2-hydroxyethyl methacrylate, 2-hydroxyethyl acrylate, 3-hydroxypropyl methacrylate, 3-hydroxypropyl acrylate, 4-hydroxybutyl methacrylate, 4-hydroxybutyl acrylate, acrylic acid, methacrylic acid, itaconic acid and esters thereof, crotonic acid and esters thereof, maleic acid and esters thereof, fumaric acid and esters thereof, maleic anhydride, methacrylamide and also N-alkylated derivatives, acrylamide and also N-alkylated derivatives, N-methylolmethacrylamide, N-methylolacrylamide, vinyl alcohol, 2-hydroxyethyl vinyl ether, 3-hydroxypropyl vinyl ether and 4-hydroxybutyl vinyl ether.

Heat-activable, bondable adhesives have no or very little adhesion at room temperature and attain their complete adhesive strength only after application of heat. Adhesives of this kind are based for example on thermoplastic polyurethane, nylon, polyester or vinyl polymers. Examples of other heat-activable, bondable adhesives which can be used are synthetic rubbers from the group of the randomly copolymerized styrene-butadiene rubbers (SBR), the butadiene rubbers (BR), the synthetic polyisoprenes (IR), the butyl rubbers (NR), the halogenated butyl rubbers (XIIR), the acrylate rubbers (ACM), the ethylene-vinyl acetate copolymers (EVA) and the polyurethanes and/or blends thereof.

Structure of the Laminate

The laminate of the invention may be an adhesive tape with carrier material wherein the at least one further layer (L1), i.e., the PSA, is applied on the opposite side of the silicone coating (SC) of the liner from the carrier layer (CL). In this embodiment, therefore, the silicone coating (SC) of the release liner A covers the PSA (L1). The release liner A must therefore be removed before use of the adhesive tape.

According to one further embodiment of the present invention, the laminate has at least one further acrylate-based PSA (S2), which is located between the silicone coating (SC) and the further layer (L1) and/or on the opposite side of the further layer (L1) from the silicone coating (SC). This allows the peel adhesion of the layer (L1) to be adapted to the surface nature of the substrate to be bonded. Examples of suitable acrylate-based adhesives are the above-recited polyacrylate-based adhesives.

Furthermore, the laminate of the invention may also be what is called an adhesive transfer tape, meaning an adhesive tape without carrier. In the case of this adhesive transfer tape, the PSA (layer (L1)), corresponding here to the adhesive tape, is applied, prior to application, between two flexible release liners A. Generally, for application, the first release liner is first removed, the PSA (layer (L1)) is applied, and then the second release liner is removed. In this way the adhesive can be used directly to join two surfaces. With a carrier-less adhesive transfer tape of this kind, a bond is enabled which is very precise in positioning and metering. In this embodiment provision may be made for the first release liner to have a different release force from the second release liner. By this means it is possible to prevent unintended partial redetachment of the freshly bonded PSA during the detachment of the second release liner.

Besides the laminates recited above, there are also laminates possible which do not have two release liners but instead have a single release liner furnished for double-sided release. In that case the laminate is lined on its top side with the facing side of a double-sided release liner A, and on its bottom side with the reverse side of the double-sided release liner A. Arrangements of this kind are suitable especially in the context of an adjacent turn on a bale or a roll. According to one preferred embodiment of the present invention, therefore, the carrier layer (CL) is coated on both sides with the above-recited silicone coating (SC). In this way a double-sided release liner A is obtained.

The laminate of the invention preferably has a thickness of 100 to 3,000 μm. The thickness of the laminate here is determined in particular by the thickness of the release liner A and also the thickness of the PSA B. Laminates with greater thicknesses can be obtained in particular through the use of foamed PSAs B.

A further subject of the present invention is the use as release liner of an arrangement comprising:

A at least one carrier layer (CL), and also

B at least one silicone coating (SC), comprising at least one addition-crosslinked or radically crosslinked pressure-sensitive silicone adhesive, where the addition-crosslinked pressure-sensitive silicone adhesive is obtainable by reacting:
- a) at least one organopolysiloxane having a weight-average molecular weight $M_w$ of 30,000 to 2,000,000 g/mol which comprises at least one diorganosiloxane unit and at least two silicon-bonded alkenyl groups,
- b) at least one compound which is suitable for crosslinking organopolysiloxanes containing alkenyl groups and comprises at least two silicon-bonded hydrogen atoms,
- c) optionally at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group, where the reaction of components a), b) and optionally c) is accelerated by a catalyst, and where the radically crosslinked pressure-sensitive silicone adhesive is obtainable by reacting:
- a) at least one organopolysiloxane having a weight-average molecular weight $M_w$ of 30,000 to 2,000,000 g/mol which comprises at least one diorganosiloxane unit and optionally at least one hydroxyl group,
- b) at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group, where the reaction of components a) and b) is initiated by a radical initiator.

Further preferred embodiments of the use of the invention, especially with regard to the addition-crosslinked or radically crosslinked silicone PSA used in the arrangement, are subject mutatis mutandis to the statements made in relation to the laminate of the invention.

The invention relates more particularly to the following embodiments:

According to a first embodiment, the invention relates to a laminate, more particularly adhesive tape, comprising:

A at least one release liner, comprising at least one carrier layer (CL) and also at least one silicone coating (SC), comprising an addition-crosslinked pressure-sensitive silicone adhesive which is obtainable by reacting:
- a) at least one organopolysiloxane having a weight-average molecular weight $M_w$ of 30,000 to 2,000,000 g/mol which comprises at least one diorganosiloxane unit and at least two silicon-bonded alkenyl groups,
- b) at least one compound which is suitable for crosslinking organopolysiloxanes containing alkenyl groups and comprises at least two silicon-bonded hydrogen atoms,
- c) optionally at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group, where the reaction of components a), b) and optionally c) is accelerated by a catalyst, B at least one further layer (L1), comprising a polyacrylate-based adhesive having low tack at room temperature or a heat-activable, bondable adhesive which has little or no pressure-sensitive adhesion at room temperature.

According to a second embodiment, the invention relates to a laminate according to embodiment 1, characterized in that the molar ratio of silicon-bonded hydrogen atoms in component b) to the silicon-bonded alkenyl groups in component a) is 0.5 to 7.

According to a third embodiment, the invention relates to a laminate according to either of embodiments 1 and 2, characterized in that component a) is used in a total amount of 20 to 60 parts by weight, component b) in a total amount of 3 to 10 parts by weight and component c) in a total amount of 30 to 75 parts by weight, based in each case on the sum total of components a), b) and c), of 100 parts by weight.

According to a fourth embodiment, the invention relates to a laminate according to any of the preceding embodiments, characterized in that the catalyst is selected from platinum catalysts or rhodium catalysts and is used preferably in a total amount of 50 to 1,000 ppm, calculated as platinum metal or rhodium metal and based on the sum total of components a), b) and c), of 100 parts by weight.

According to a fifth embodiment, the invention relates to a laminate, more particularly adhesive tape, comprising:

A at least one release liner, comprising at least one carrier layer (CL) and also at least one silicone coating (SC), comprising a radically crosslinked pressure-sensitive silicone adhesive which is obtainable by reacting:
- a) at least one organopolysiloxane having a weight-average molecular weight $M_w$ of 30,000 to 2,000,000 g/mol which comprises at least one diorganosiloxane unit and optionally at least one hydroxyl group,
- b) at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group, where the reaction of components a) and b) is initiated by a radical initiator, B at least one further layer (L1), comprising a polyacrylate-based adhesive having low tack at room temperature or a heat-activable, bondable adhesive which has little or no pressure-sensitive adhesion at room temperature.

According to a sixth embodiment, the invention relates to a laminate according to embodiment 5, characterized in that component a) is used in a total amount of 25 to 55 parts by weight and component b) in a total amount of 45 to 75 parts by weight, based in each case on the sum total of components a) and b), of 100 parts by weight.

According to a seventh embodiment, the invention relates to a laminate according to embodiment 5 or 6, characterized in that the radical initiator is selected from peroxo initiators, more particularly from benzoyl peroxide, and is used preferably in a total amount of 5 to 15 parts by weight, based on the sum total of components a) and b), of 100 parts by weight.

According to an eighth embodiment, the invention relates to a laminate according to any of the preceding embodiments, characterized in that the silicone resin has a weight-average molecular weight $M_w$ of 1,000 to 25,000 g/mol.

According to a ninth embodiment, the invention relates to a laminate according to any of the preceding embodiments, characterized in that the silicone coating (SC) has a weight ratio of the organopolysiloxane a) to the silicone resin of 1:1 to 1:3, more particularly of 2:3 to 1:2.

According to a tenth embodiment, the invention relates to a laminate according to any of the preceding embodiments, characterized in that the silicone coating (SC) has a removal force of 3.0 to 200 cN/cm, preferably of 4.0 to 190 cN/cm, more particularly of 5.0 to 180 cN/cm, the removal force being determined by the measurement method defined herein.

According to an eleventh embodiment, the invention relates to a laminate according to any of the preceding embodiments, characterized in that the silicone coating (SC) has a thickness of 0.5 to 200 µm, more particularly of 1.0 to 100 µm.

According to a twelfth embodiment, the invention relates to a laminate according to any of the preceding embodiments, characterized in that the carrier layer (CL) is coated on both sides with the silicone coating (SC).

According to a thirteenth embodiment, the invention relates to a laminate according to any of the preceding embodiments, characterized in that the at least one further layer (L1) is applied on the opposite side of the silicone coating (SC) of the liner from the carrier layer (CL).

According to a fourteenth embodiment, the invention relates to a laminate according to any of the preceding embodiments, characterized in that it has a thickness of 100 to 3,000 µm.

According to a fifteenth embodiment, the invention relates to the use as release liner of an arrangement comprising:
A at least one carrier layer (CL), and also
B at least one silicone coating (SC), comprising at least one addition-crosslinked or radically crosslinked pressure-sensitive silicone adhesive,
where the addition-crosslinked pressure-sensitive silicone adhesive is obtainable by reacting:
a) at least one organopolysiloxane having a weight-average molecular weight $M_w$ of 30,000 to 2,000,000 g/mol which comprises at least one diorganosiloxane unit and at least two silicon-bonded alkenyl groups,
b) at least one compound which is suitable for crosslinking organopolysiloxanes containing alkenyl groups and comprises at least two silicon-bonded hydrogen atoms,
c) optionally at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group,
where the reaction of components a), b) and optionally c) is accelerated by a catalyst,
and
where the radically crosslinked pressure-sensitive silicone adhesive is obtainable by reacting:
a) at least one organopolysiloxane having a weight-average molecular weight $M_w$ of 30,000 to 2,000,000 g/mol which comprises at least one diorganosiloxane unit and optionally at least one hydroxyl group,
b) at least one silicone resin having a weight-average molecular weight $M_w$ of 500 to 29,999 g/mol which comprises at least one structural unit $(R^1{}_3SiO_{1/2})$, $(R^1SiO_{3/2})$, $(R^1{}_2SiO_{2/2})$ or $(SiO_{4/2})$, in which $R^1$ is an organic group, more particularly a substituted or unsubstituted monovalent hydrocarbon group,
where the reaction of components a) and b) is initiated by a radical initiator.

EXAMPLES

The present invention is elucidated in more detail below with the following working examples.
Removal Force or Release Force:
The removal force of the liners was determined using the test adhesives tapes indicated in each case.
Sample Preparation:
A strip of the adhesive tape 30 cm long was adhered, by the side exposed on unrolling, to the side of the liner provided with the silicone coating (SC), and was pressed on in a defined way by rolling the tape down 10 times with a 150 g steel roller. The specimen was then slit into strips along the adhered adhesive tape strips, and the samples thus produced were stored horizontally at room temperature for a week prior to measurement.
Measurement:
The liner on the unbonded side of the adhesive tape located on the liner under investigation was removed, and the sample was fastened to a PE carrier plate by the exposed adhesive layer. The fastening was such that a short piece of the liner under investigation protruded beyond the plate. The test plate, with the prolonged end of the liner under investigation pointing downward, was then clamped into the lower jaws of a tensile testing machine (BZ2.5/TN1S, Zwick). The prolonged end of the liner under investigation was clamped into the upper jaws and removed at an angle of 180° with a machine speed of 300 mm/min.
Gel Permeation Chromatography (GPC):
GPC can be used to determine the weight-average molecular weights ($M_w$) of the organopolysiloxanes and silicone resins used. The settings used for the determination were as follows: toluene eluent; measuring temperature 23° C.; pre-column PSS-SDV, 5 µm, 102 Å (10 nm), ID 8.0 mm×50 mm; separation: columns PSS-SDV, 5 µm, 102 Å (10 nm), and also 103 Å (100 nm), and 106 Å (105 nm), each with ID 8.0 mm×300 mm; sample concentration 3 g/l, flow rate 1.0 ml per minute; polydimethylsiloxane standards.
Raw Materials Used:

| | |
|---|---|
| DC 7651 | Dispersion of polydimethylmethylvinylsiloxane gum and resin in xylene and toluene (about 40 wt % silicone solids content, PDMS/resin = 70/30 (wt/wt)) |
| DC 7066 | Dispersion of MQ silicone resin in toluene (60 wt % silicone solids content) |
| Syl-Off 7678 | Methylhydrogensiloxane crosslinker (100 wt % silicone solids content) |
| Syl-Off 4000 | Reactive organoplatinum complex (5,000 ppm platinum metal), in dispersion in polysiloxane. |
| DC 7358 | Dispersion of polydimethylsiloxane gum and resin in xylene and toluene (56.5 wt % silicone solids content) |
| BPO | Benzoyl peroxide (CAS No.: 94-36-0) |

Production of Laminates with a Silicone Coating (SC) Comprising Addition-Crosslinked Silicone PSAs and Determination of the Release Force:
The amounts indicated in Table 1 below of DC 7651, Syl-Off 7678, Syl-Off 4000 and, where used, DC 7066 were mixed and the mixture was diluted in each case with 10 mL of benzine. These mixtures were homogenized with a magnetic stirrer for 30 minutes, applied in the form of a thin layer to a substrate, and crosslinked at 120° C. for 30 seconds.
The release liners obtained were stuck to two adhesive tapes comprising acrylate-based PSAs with low tack at room temperature. For this purpose, strips of each of the test tapes tesa ACX-plus #7812 and also tesa ACX-plus #6812 were used. The removal force was determined subsequently, by the method above.

TABLE 1

Amounts used and resulting release forces (LRFs):

| Laminate | Amount of DC 7651 [g] | Amount of DC 7066 [g] | DC7651/ DC7066 | Amount of Syl-Off 7678 [g] | Amount of Syl-Off 4000 [g] | LRF ACX-plus # 7812, [cN/cm] | LRF ACX-plus # 6812, [cN/cm] |
|---|---|---|---|---|---|---|---|
| #1 | 15.0 | 0 | 100/0 | 0.31 | 0.46 | 10 | 35 |
| #2 | 15.0 | 1.24 | 90/10 | 0.31 | 0.46 | 26 | 80 |
| #3 | 15.0 | 4.12 | 73/27 | 0.38 | 0.44 | 90 | 126 |
| #4 | 15.0 | 7.42 | 60/40 | 0.38 | 0.69 | 180 | 154 |

The laminates of the invention have a sufficient release force of at least 3 cN/cm. This ensures that the release liner does not accidentally detach from the PSA during production, storage and also use. By raising the fraction of MQ resin in the silicone coating it is possible to increase the release performance of the liner and so to adapt it to the particular intended application.

Production of Laminates with a Silicone Coating (SC) Comprising Radically Crosslinked Silicone PSAs and Determination of the Release Force:

The amounts indicated in Table 2 below of DC 7358, DC 7066 and BPO were mixed and the mixture was diluted in each case with 10 mL of benzine. These mixtures were homogenized with a magnetic stirrer for 30 minutes, applied in the form of a thin layer to a substrate, and crosslinked at 170° C. for 3 minutes.

The release liners obtained were stuck to two adhesive tapes comprising acrylate-based PSAs with low tack at room temperature. For this purpose, strips of each of the test tapes tesa ACX-plus #7812 and also tesa ACX-plus #6812 were used. The removal force was determined subsequently, by the method above.

TABLE 2

Amounts used and resulting release forces (LRFs):

| Example | Amount of DC 7358 [g] | Amount of DC 7066 [g] | DC 7358/ DC 7066 | BPO [g] | LRF ACX-plus # 7812, [cN/cm] | LRF ACX-plus # 6812, [cN/cm] |
|---|---|---|---|---|---|---|
| #5 | 15.0 | 1.51 | 90/10 | 1.01 | 5.7 | 25 |
| #6 | 15.0 | 3.39 | 80/20 | 1.18 | 7.8 | 41 |

The laminates of the invention have a sufficient release force of at least 3 cN/cm. This ensures that the release liner does not accidentally detach from the PSA during production, storage and also use. By raising the fraction of MQ resin it is possible to increase the release performance of the liner and so to adapt it to the particular intended application.

The invention claimed is:

1. A laminate, comprising:
   A) at least one release liner that comprises at least one carrier layer (CL) and at least one silicone coating (SC), wherein the at least one silicone coating (SC) comprises an addition-crosslinked, pressure-sensitive silicone adhesive derived from:
      a) at least one organopolysiloxane having a weight-average molecular weight $M_w$ of 30,000 to 2,000,000 g/mol and comprising at least one diorganosiloxane unit and at least two silicon-bonded alkenyl groups,
      b) at least one compound for crosslinking the a) at least one organopolysiloxane, wherein the at least one compound comprises at least two silicon-bonded hydrogen atoms,
      c) at least one silicone resin having a weight-average molecular weight $M_w$ of 500 to 29,999 g/mol and comprising at least one structural unit $(R^1_3SiO_{1/2})$, $(R^1SiO_{3/2})$, $(R^1_2SiO_{2/2})$ or $(SiO_{4/2})$, in which the $R^1$ is an organic group, and
      d) a catalyst for accelerating a reaction of the a), b) and c); and
   B) at least one further layer (L1) that comprises a polyacrylate-based adhesive comprising α,β-unsaturated acrylic acid or acrylates,
   wherein a weight ratio of the (a) at least one organopolysiloxane to the (c) at least one silicon resin is 1:1 to 1:3,
   wherein the a) at least one organopolysiloxane is at a total amount of 20 to 60 parts by weight, the b) at least one compound is at a total amount of 3 to 4 parts by weight and the c) at least one silicone resin is at a total amount of 30 to 75 parts by weight, as based on a sum total of the a), b) and c) at 100 parts by weight, and
   further wherein the at least one silicone coating (SC) has a Release Force of 140 to 190 cN/cm.

2. The laminate according to claim 1, wherein a molar ratio of the at least two silicon-bonded hydrogen atoms to the at least two silicon-bonded alkenyl groups is 0.5 to 7.

3. The laminate according to claim 1, wherein the d) catalyst is a platinum catalyst or a rhodium catalyst, and further wherein the d) catalyst is at a total amount of 50 to 1,000 ppm, as calculated as platinum metal or rhodium metal, respectively, and based on a sum total of the a), b) and c) at 100 parts by weight.

4. The laminate according to claim 1, wherein the laminate is an adhesive tape.

5. The laminate according to claim 1, wherein the $R^1$ is a substituted or unsubstituted monovalent hydrocarbon group.

6. The laminate according to claim 1, wherein the c) at least one silicone resin has a weight-average molecular weight $M_w$ of 1,000 to 25,000 g/mol.

7. The laminate according to claim 1, wherein the at least one silicone coating (SC) has a thickness of 0.5 to 200 μm.

8. The laminate according to claim 1, wherein the at least one carrier layer (CL) comprises two sides, and further wherein the at least one carrier layer (CL) is coated on both of the sides with the at least one silicone coating (SC).

9. The laminate according to claim 1, wherein the at least one silicone coating (SC) of covers the polyacrylate-based adhesive.

10. The laminate according to claim 1, wherein the laminate has a thickness of 100 to 3,000 μm.

11. A laminate, comprising:
A) at least one release liner that comprises at least one carrier layer (CL) and at least one silicone coating (SC), wherein the at least one silicone coating (SC) comprises an addition-crosslinked, pressure-sensitive silicone adhesive derived from:
  a) at least one organopolysiloxane having a weight-average molecular weight $M_w$ of 30,000 to 2,000,000 g/mol and comprising at least one diorganosiloxane unit and at least two silicon-bonded alkenyl groups,
  b) at least one compound for crosslinking the a) at least one organopolysiloxane, wherein the at least one compound comprises at least two silicon-bonded hydrogen atoms,
  c) at least one silicone resin having a weight-average molecular weight $M_w$ of 500 to 29,999 g/mol and comprising at least one structural unit $(R^1{}_3SiO_{1/2})$, $(R^1SiO_{3/2})$, $(R^1{}_2SiO_{2/2})$ or $(SiO_{4/2})$, in which the $R^1$ is an organic group, and
  d) a catalyst for accelerating a reaction of the a), b) and c); and
B) at least one further layer (L1) that comprises a polyacrylate-based adhesive comprising αβ-unsaturated acrylic acid or acrylates,
wherein a weight ratio of the (a) at least one organopolysiloxane to the (c) at least one silicon resin is 1:1 to 1:3,
wherein the a) at least one organopolysiloxane is at a total amount of 20 to 60 parts by weight, the b) at least one compound is at a total amount of 3 to 4 parts by weight and the c) at least one silicone resin is at a total amount of 30 to 75 parts by weight, as based on a sum total of the a), b) and c) at 100 parts by weight, and
wherein the at least one silicone coating (SC) has a Release Force of 150 cN/cm to 200 cN/cm.

12. The laminate of claim 1, wherein the at least one silicone coating (SC) has a Release Force of 140 cN/cm to 180 cN/cm, and further wherein the a) least one organopolysiloxane is at a total amount of 35 to 55 parts by weight and the c) at least one silicone resin is at a total amount of 55 to 65 parts by weight.

13. The laminate of claim 11, wherein the at least one silicone coating (SC) has a Release Force of 150 cN/cm to 180 cN/cm, and further wherein the a) least one organopolysiloxane is at a total amount of 35 to 55 parts by weight and the c) at least one silicone resin is at a total amount of 55 to 65 parts by weight.

* * * * *

UNITED STATES PATENT AND TRADEMARK OFFICE
CERTIFICATE OF CORRECTION

PATENT NO. : 12,031,068 B2
APPLICATION NO. : 16/965412
DATED : July 9, 2024
INVENTOR(S) : Belov et al.

Page 1 of 1

It is certified that error appears in the above-identified patent and that said Letters Patent is hereby corrected as shown below:

In the Claims

Column 16, Claim 9, Line 64:
After "(SC)" delete "of".

Column 17, Claim 11, Line 23:
"αβ" should be — α,β —.

Signed and Sealed this
Twenty-fourth Day of September, 2024

Katherine Kelly Vidal
*Director of the United States Patent and Trademark Office*